Patented Jan. 5, 1937

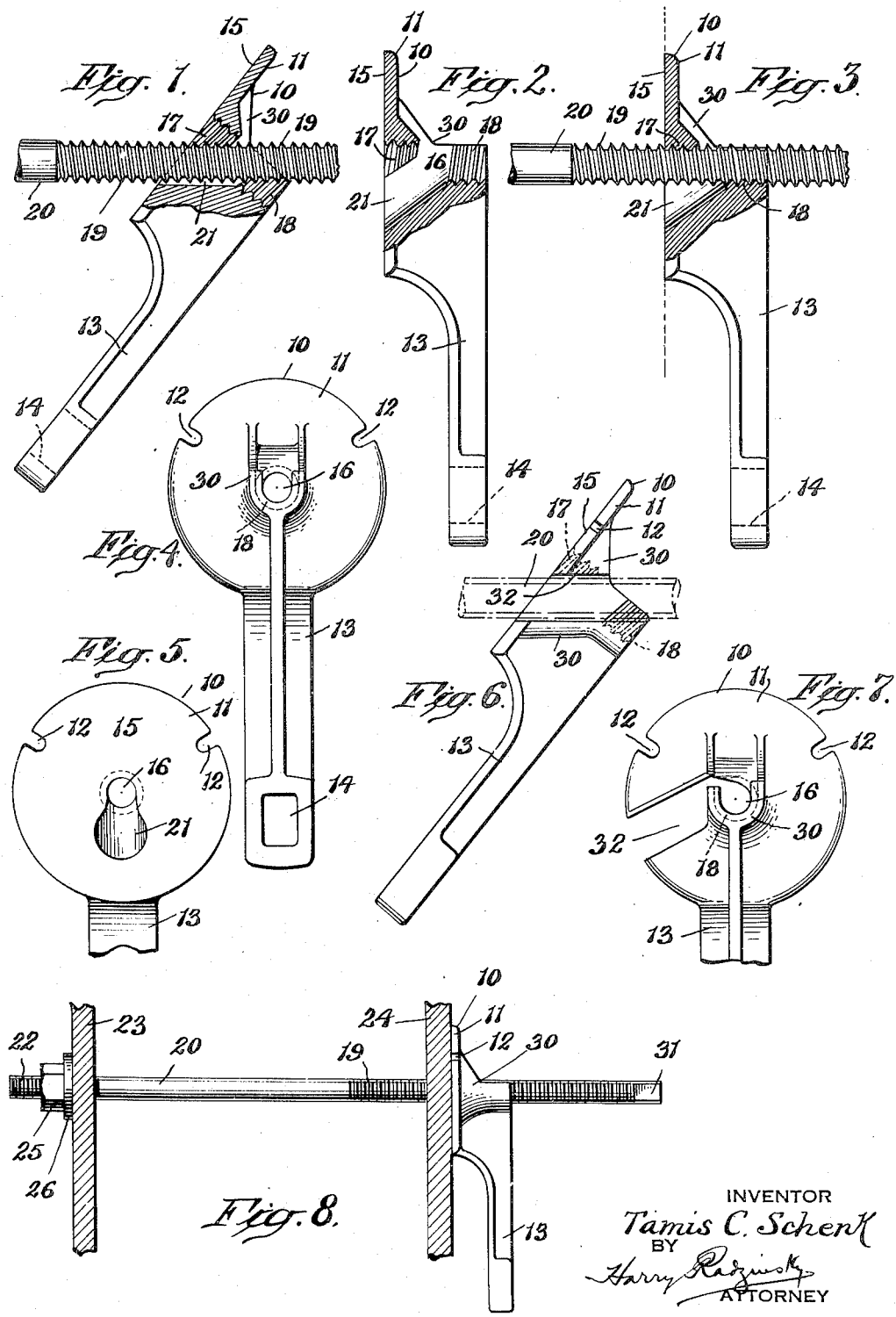

2,066,541

UNITED STATES PATENT OFFICE 2,066,541

CLAMP THREADED CONNECTION

Tamis C. Schenk, New York, N. Y., assignor to Richmond Screw Anchor Co., Inc., Brooklyn, N. Y., a corporation of New York Application April 14, 1936, Serial No. 74,285

1 Claim. (Cl. 85—32)

This invention relates to clamping nuts such as used in many environments, and has for its object the provision of an internally threaded nut capable of secure threaded reception upon a bolt, threaded rod or other threaded element, but so constructed as to permit an easy, immediate disengagement from the bolt or rod without requiring it to be unthreaded therefrom.

More particularly, the invention contemplates the provision of a nut or similar member having an internally threaded portion normally engaging the threads of a rod or bolt of conventional design, the aperture extending through the nut having an angular portion permitting angulation or manual tilting of the nut on the bolt under certain conditions, the tilting of the nut causing its threads to be disengaged from those on the bolt and enabling the nut to be slid off the bolt by straight pull without requiring an unthreading operation.

A device of this character is capable of numerous uses, one of which is in concrete construction where it may be used as a form tie for holding form boards in position and where speedy, accurate adjustment of the form boards is highly desirable. It can also be used in many other environments and will be found highly advantageous in all cases where the quick adjustment or removal of a nut or other clamping element upon a long threaded rod, bolt or shaft is desirable.

In the accompanying drawing wherein an embodiment of the invention is shown, Fig. 1 is a side elevation, partly in section, of a nut and bolt assembly made in accordance with the invention, with the nut disposed in a tilted or inclined position; Fig. 2 is a side elevation, partly in section; Fig. 3 is a view of the structure shown in Fig. 1, showing the nut in its normal position with its threaded portions in engagement with the threads on the bolt member; Fig. 4 is an outer face view of the nut; Fig. 5 is a view of the inner face of the nut, opposite to that shown in Fig. 4; Fig. 6 is a side view of a modified structure; Fig. 7 is a face view of the structure shown in Fig. 6; and Fig. 8 is a view of the complete structure shown as used for holding form boards or other structures in position.

The invention includes a nut member 10 which may be of any suitable shape, the general shape thereof being dependent upon the particular use to which the device is to be put.

In the drawing the nut member shown at 10 is shaped to satisfactorily perform the function of a clamp for use in connection with holding concrete form boards in position. It comprises a body portion provided with a disc-like element 11 having its edges notched or recessed at 12 and formed with an integral radially projecting arm 13 terminating at its outer end in an aperture 14 for a purpose to be later described.

The disc shaped portion 11 is formed with a flat bearing surface 15 and an aperture 16 extends therethrough and through its central boss 30, the longitudinal axis of said aperture being at substantially right angles to the bearing surface 15. At its opposite ends the aperture is threaded as at 17 and 18, these threads extending partly around the aperture 16 and being adapted to engage, in the normal use of the nut, the threads 19 provided on a bolt member 20 or other threaded element. At 21 is shown an angular passage which extends through the nut and connects into the transverse passage 16 as clearly shown in Fig. 2. This angular passage forms an elongated opening at the end of the nut 10 where bearing surface 15 is located and permits the nut to be manually tilted on the bolt member 20 as shown in Fig. 1. When such tilting occurs, the threaded portions 17 and 18 on the interior of the nut become disengaged from the threads 19 on the bolt, and the nut held in such tilted position, may be drawn longitudinally of the bolt and removed therefrom by a direct pull.

In Fig. 8 the device is shown as applied to concrete form work. There, the bolt 20 is provided with the threads 19 at one end and threads 22 at the opposite end. The form boards 23 and 24, suitably braced, are held in spaced relationship by means of the nut and washer 25 and 26 at one end of the bolt and the improved nut 10 at the opposite end. To place the nut 10 on the threaded end 19 of the bolt, the nut 10 is held in an inclined or tilted position and the bolt is thrust through the angular passage 21 and forced toward the form board 24. When it reaches a point close to the board, it is swung back to its normal position with the bearing face 15 at right angles to the longitudinal axis of the bolt 20 and substantially parallel to the face of the form board 24. This causes the threaded portions 17 and 18 within the nut to be brought into thread engagement with threads 19 and the nut is then rotated or threaded inwardly in the conventional manner, to the extent required to bring this bearing face firmly against the face of the form boards. As long as the bearing face 15 on nut 10 is in contact with the face of the form board, it is obvious that the nut cannot tilt or assume an inclined position on the bolt 19 and consequently it remains securely in place as though it was of usual nut construction.

In removing the nut, it is merely necessary to unthread it sufficiently until bearing surface 15 has been moved for a sufficient distance away from the face of the form board 24 to permit the nut to be manually inclined or tilted on the threaded portion 19 of the bolt as shown in Fig. 1, thereby causing the angular passage 21 to surround the threaded part 19 and threads 17 and 18 to be disengaged from the threads 19. The nut may now be pulled directly along the bolt and away from the end of it. The arm 13 on the nut permits the nut to be easily rotated by hand and if necessary, with a tool or other instrument, inserted in the aperture 14. When the nut has been tightened up to a suitable extent, it can be prevented from rotative movement by a nail driven into the form boards within either one of the apertures 12. The aperture 14 in the end of arm 13 enables the nut to be used as a wrench after it has been removed, to remove the threaded bolt 20 from within the concrete structure, the aperture 14 engaging over the squared end 31.

In Figs. 6 and 7 a modification is shown wherein the disc-like portion 11 of the device is provided with a radial slot 32 leading into and connecting with the angular passage 21. This arrangement facilitates the placement of the nut 10 on the bolt 20, since it permits the bolt to be held in an angular position and slid directly on the bolt with an edgewise movement. As soon as the bolt reaches the inner end of slot 32, it is then situated in the angular passage 21. The nut is then moved to its vertical position, this movement causing the threaded portions 17 and 18 to engage the threads 19 on the bolt and the nut is then tightened up by the usual rotative movement.

While I have particularly described the device for use in connection with concrete forms, it will be obvious that it has many uses and particularly wherever the conventional type of nut and bolt structure is used.

What I claim is:

A device of the character described comprising, a threaded rod, a nut received thereon, a passage extending through said nut and threaded for thread-reception upon the threads on the rod, said passage having an angular part permitting tilting of the nut on the rod and resultant disengagement of the threaded parts of the nut from the threads on the rod by such tilting movement, said nut being formed with a radial slot extending from the angular portion of the passage to the edge of the nut whereby the nut may be placed on the rod or removed therefrom by movement transverse to the axis of the rod only while said nut is held tilted with respect to the rod.

TAMIS C. SCHENK.